(12) United States Patent
Roen (10) Patent No.: US 8,867,173 B1
(45) Date of Patent: Oct. 21, 2014

(54) BALANCED MULTI-TRACE TRANSMISSION IN A HARD DISK DRIVE FLEXURE

(71) Applicant: Hutchinson Technology Incorporated, Hutchinson, MN (US)

(72) Inventor: Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/146,760

(22) Filed: Jan. 3, 2014

(51) Int. Cl.
*G11B 5/48* (2006.01)

(52) U.S. Cl.
CPC ..................................... *G11B 5/486* (2013.01)
USPC ...................................................... 360/245.9

(58) Field of Classification Search
CPC .............................. G11B 5/486; G11B 5/4853
USPC ..................................... 360/245.8, 245.9, 246
See application file for complete search history.

(56) References Cited

U.S. PATENT DOCUMENTS

| | | | | |
|---|---|---|---|---|
| 5,712,749 | A * | 1/1998 | Gustafson | 360/246 |
| 5,717,547 | A * | 2/1998 | Young | 360/246 |
| 6,038,102 | A * | 3/2000 | Balakrishnan et al. | 360/264.2 |
| 7,710,687 | B1 * | 5/2010 | Carlson et al. | 360/244.3 |
| 8,154,827 | B2 * | 4/2012 | Contreras et al. | 360/264.2 |
| 8,189,281 | B2 * | 5/2012 | Alex et al. | 360/46 |
| 8,233,240 | B2 * | 7/2012 | Contreras et al. | 360/245.9 |
| 8,289,656 | B1 | 10/2012 | Huber | |
| 8,300,363 | B2 * | 10/2012 | Arai et al. | 360/245.8 |
| 8,305,712 | B2 * | 11/2012 | Contreras et al. | 360/245.9 |
| 8,665,565 | B2 * | 3/2014 | Pro et al. | 360/245.9 |
| 8,681,456 | B1 | 3/2014 | Miller et al. | |
| 2005/0180053 | A1 * | 8/2005 | Dovek et al. | 360/246 |
| 2010/0007993 | A1 * | 1/2010 | Contreras et al. | 360/245.8 |
| 2011/0141626 | A1 * | 6/2011 | Contreras et al. | 360/245.4 |
| 2012/0081813 | A1 * | 4/2012 | Ezawa et al. | 360/121 |
| 2012/0081815 | A1 * | 4/2012 | Arai et al. | 360/245.8 |
| 2012/0279757 | A1 * | 11/2012 | Ishii et al. | 174/250 |
| 2013/0107488 | A1 * | 5/2013 | Arai | 361/790 |
| 2013/0176646 | A1 * | 7/2013 | Arai | 360/245.8 |
| 2014/0078621 | A1 | 3/2014 | Miller et al. | |

FOREIGN PATENT DOCUMENTS

JP     2003234549 A   *   8/2003
JP     2008276927 A   *   11/2008

OTHER PUBLICATIONS

"Calculating VLSI Wiring Capacitance," Jun. 1990, IBM Technical Disclosure Bulletin, vol. 33, Iss. No. 1A, pp. 416-419.*
English Machine Translation of JP 2003-234549 A to Motogami et al., published on Aug. 22, 2003.*

(Continued)

*Primary Examiner* — Will J Klimowicz
(74) *Attorney, Agent, or Firm* — Faegre Baker Daniels LLP (57) ABSTRACT

Various embodiments concern a flexure comprising a base metal layer. The base metal layer can have a void between a first lateral side and a second lateral side. The flexure can further comprise a plurality of traces in an array. The plurality of traces can extend over the void and between the first and second lateral sides. The plurality of traces can comprise a pair of outer traces respectively located on lateral ends of the array and at least one inner trace between the pair of outer traces. The plurality of traces and the first and second lateral sides can be spaced relative to each other such that adjacent traces of the plurality of traces capacitively couple to each other and the pair of outer traces capacitively couple with each other through the first and second lateral sides.

28 Claims, 10 Drawing Sheets

(56) References Cited

OTHER PUBLICATIONS

Hentges, Reed T. et al., "Exploring Low Loss Suspension Interconnects for High Data Rates in Hard Disk Drives", IEEE Transactions on Magnetics, vol. 44, No. 1, Jan. 2008, pp. 169-174.

Pozar, David M. Microwave Engineering, 4th Edition, copyright 2012 by John Wiley & Sons, Inc., pp. 422-426.

U.S. Appl. No. 14/163,279 to Roen, Michael E. entitled Stepped Impedance Flexure Design in a Hard Disk Drive, filed Jan. 24, 2014.

* cited by examiner

BALANCED MULTI-TRACE TRANSMISSION IN A HARD DISK DRIVE FLEXURE

TECHNICAL FIELD

The present invention relates to disk drives. In particular, various embodiments of the invention concern a flexure having arrays of traces with the same width and/or signal propagation rates.

BACKGROUND

Figure 1:
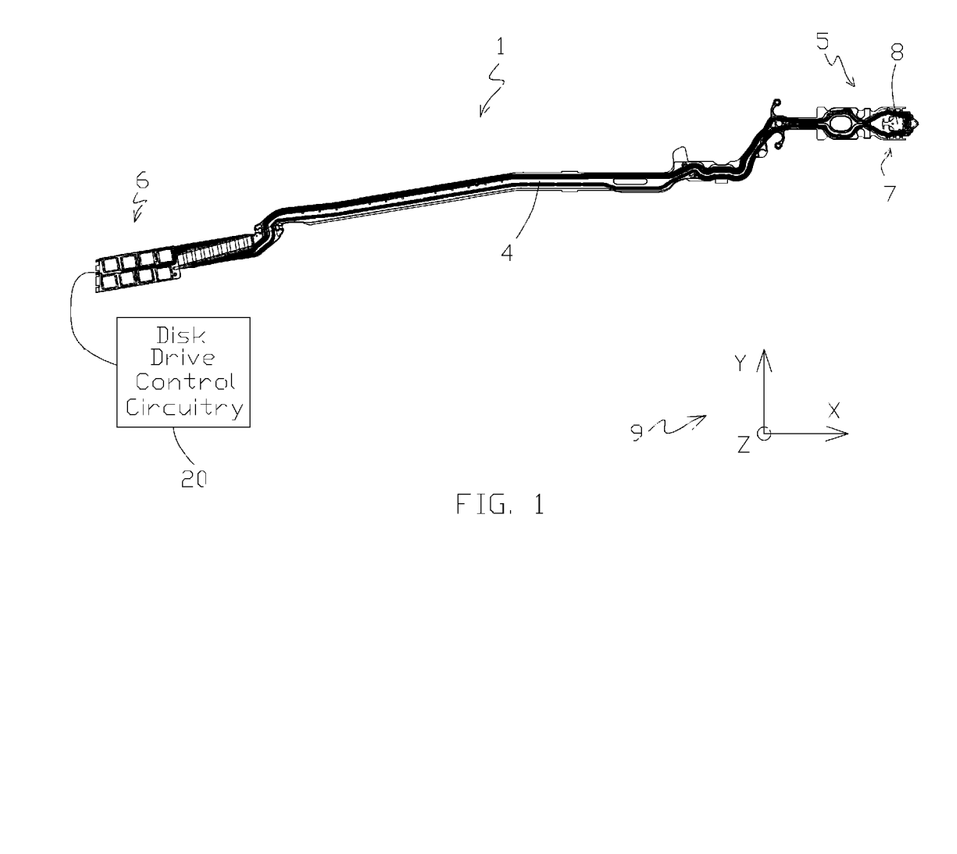
FIG. 1 is a plan view of a flexure and a suspension of a disk drive.

Disk drive flexures are generally known and commercially available. Typical flexures transmit signals along disk drive suspensions. Flexures comprise traces that extend along the suspension to electrically connect disk drive control circuitry with electrical elements such as read/write transducers on the distal end of the suspensions. FIG. 1 shows a plan view of a flexure 1. The flexure 1 includes a proximal end 6 and a distal end 5. A trace array 4 extends along the flexure 1 from the proximal end 6 to the distal end 5. The trace array 4 can be one of several trace arrays, such as separate send and receive trace arrays. Traces of the trace array 4 carry signals that travel between the proximal end 6 and the distal end 5. The trace arrays 4 can electrically connect with transducers 7 or other electrical elements at a distal end 5 of the flexure 1. As shown, the distal end 5 of the flexure 1 includes a tongue 8 which can support the transducers 7. The transducers 7 can be configured to preform read and/or write functions with spinning disk media. The trace array 4 extends to a proximal end 6 of the flexure 1. The trace array 4 can electrically connect with disk drive control circuitry 20. The disk drive control circuitry 20 can include one or more processors configured to control the function of the hard disk drive, including reading and writing functions with the transducers 7 by sending and receiving signals along the trace array 4.

Figure 2:
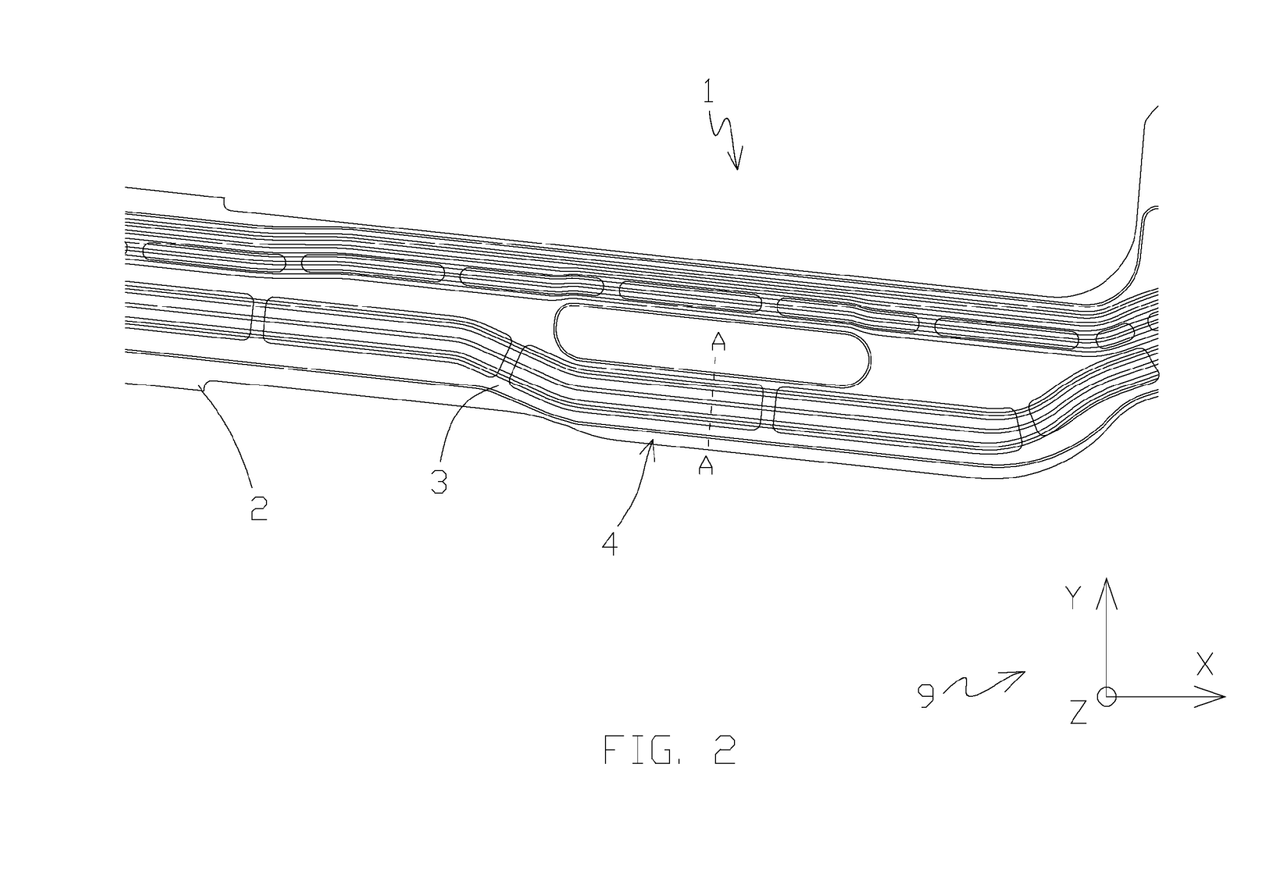
FIG. 2 is a plan view of a section of the flexure of FIG. 1.

FIG. 2 shows a plan view of a section of the flexure 1 of FIG. 1. The flexure 1 comprises a base metal layer 2. The base metal layer 2 can extend from the proximal end 6 to the distal end 5 of the flexure 1. The base metal layer 2 can be formed from stainless steel, however other types of metal can alternatively be used, such as copper. The base metal layer 2 can be the major structural backbone of the flexure 1. For example, most or all of the structural rigidity of the flexure 1 can be provided by the base metal layer 2. The thickness of the base metal layer 2 can be between 10-20 micrometers, for example. The base layer 2 supports a dielectric layer 3. The dielectric layer 3 can comprise a first or bottom side that directly contacts the base metal layer 2. A preferred thickness (e.g., measured along the Z-axis) of the dielectric layer 3 is 10 micrometers, although a suitable thickness can range from 5-20 micrometers for various embodiments. The thickness of the base metal layer 2 can be between 10-20 micrometers, for example. The dielectric layer 3 can be attached to the base metal layer 2. The dielectric layer 3 can be formed from a polymer, such as polyimide.

Figure 3:
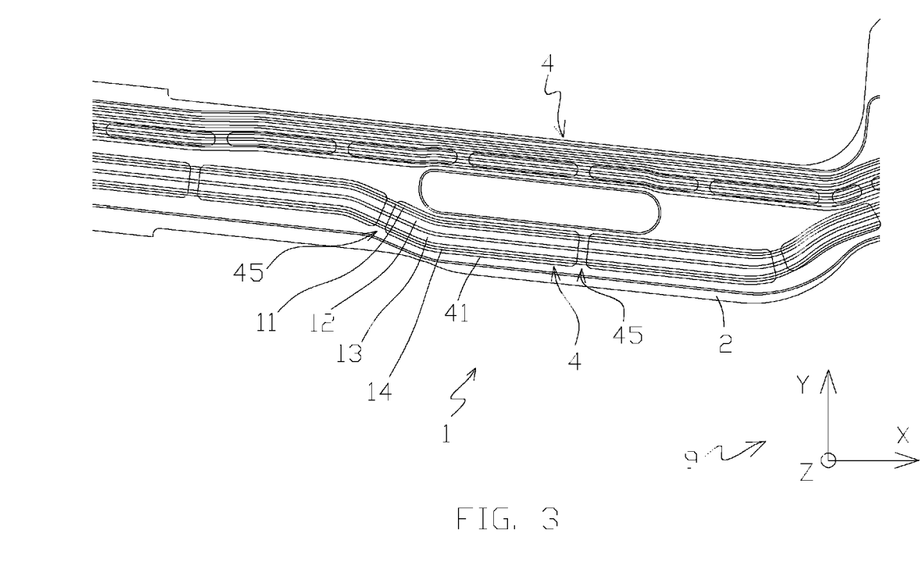
FIG. 3 is a plan view of the flexure section of FIG. 2 but with insulating material removed to reveal detail.
Figure 4:
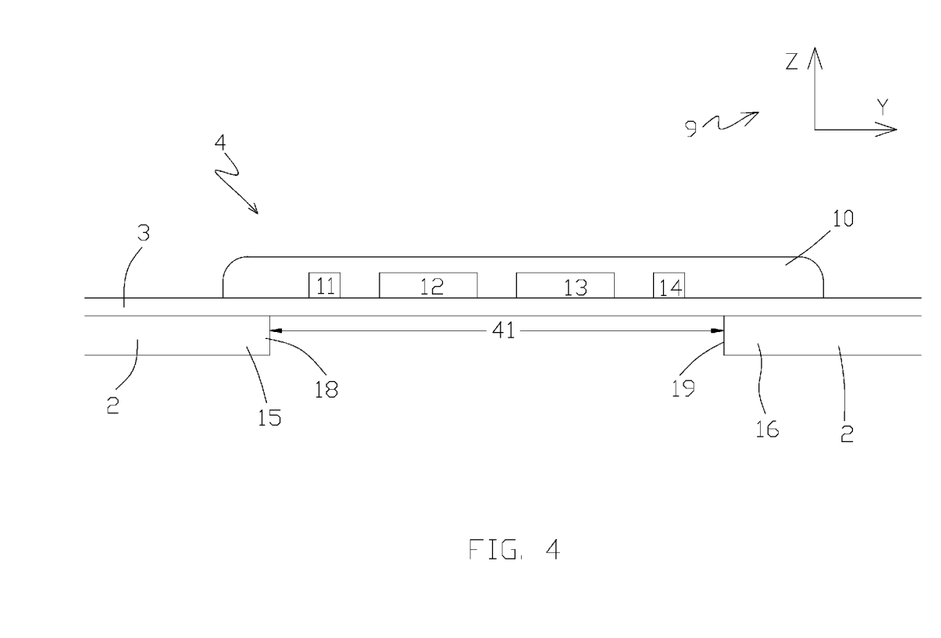
FIG. 4 is a cross sectional view of the flexure along line AA of FIG. 2.

FIG. 3 shows a plan view of the section of the flexure 1 of FIG. 2 but with insulating material, such as the dielectric layer 3, removed to show detail. FIG. 4 shows a cross sectional view of the trace array 4 along line AA of FIG. 2. The trace array 4 is located on the second or top side of the dielectric layer 3. The trace array 4 comprises a plurality of traces 11-14. The traces 11-14 can be located on the top surface of the dielectric layer 3 or may be partially or fully embedded in the dielectric layer 3. A covercoat 10 can be placed over the trace array 4. The traces 11-14 can be formed from copper, however other conductive metals or other conductive materials can additionally or alternatively be used. The trace array 4 includes a pair of outer traces 11, 14 and two inner traces 12, 13. The base metal layer 2 comprises a first lateral side 15 and a second lateral side 16 separated by window 41. The window 41 is defined laterally by a first lateral edge 18 and a second lateral edge 19 and proximally and distally by bridges 45. The bridges 45 comprise sections of the base metal layer 2 that span between the first and second lateral sides 15, 16.

The plurality of traces 11-14 of the array 4 can be interleaved. Interleaved trace arrays comprise traces of alternating polarities along a width of the flexure. Specifically, the disk drive control circuitry 20 (e.g., including routing by trace jumpers) can be configured to output signals to the plurality of traces 11-14 such that each trace is adjacent only to traces having the opposite polarity. Likewise, transducers 7 or other electrical elements electrically connected with the traces 11-14 can be configured to receive, and function using, the arrangement of alternating polarized signals corresponding to the interleaved array 4. Interleaving traces can reduce impedance and improve electrical performance characteristics of the trace array 4. U.S. Pat. No. 5,717,547 to Young and U.S. Pat. No. 8,300,363 to Arai et al. disclose flexures having interleaved trace arrays, each of which is incorporated herein by reference in its entirety and for all purposes.

The traces 11-14 can be interleaved such that trace 11 carries a first polarity (e.g., positive), trace 12 carries a second polarity (e.g., negative) opposite to the first polarity, trace 13 carries the first polarity, and trace 14 carries the second polarity. The polarities can reverse during data transmission and/or can be in a different arrangement. Respective electromagnetic fields are generated by current traveling down the traces 11-14. Specifically, an electromagnetic field radiates outward from each of the traces 11-14 (e.g., along the Y-axis). The window 41 is wide enough such that the electromagnetic fields generated by the traces 11-14 do not interact with the first lateral side 15 and the second lateral side 16 of the base metal layer 2. Specifically, the pair of outer traces 11, 14 are spaced far enough away from the first and second lateral sides 15, 16, respectively, such that the pair of outer traces 11, 14 do not capacitively couple with the first and second lateral sides 15, 16, respectively. Outer traces 11, 14 would commonly be separated from the first and second lateral side 15, 16 by 50 micrometers, respectively, to prevent electromagnetic interaction between the pair of outer traces 11, 14 and the first and second lateral sides 15, 16, respectively, which may otherwise lead to loss and degradation of the respective signals carried by the pair of outer traces 11, 14. The traces 11-14 are close enough to each other such that the fields interact with adjacent traces. For example, adjacent pairs of the traces 11-14 capacitively couple to each other when current passes though the traces. It is noted that each of the outer traces 11, 14 only capacitively couples to a respective one of the inner traces 12, 13, while each of the inner traces 12, 13 respectively couples to the other inner trace 12, 13 and one of the outer traces 11, 14. As such, inner traces 12, 13 have higher (e.g., double) the capacitive interaction as outer traces 11, 14. The difference in capacitive interaction complicates synchronous electromagnetic wave propagation in the traces 11-14, as further discussed herein.

The time delay of propagation of an electromagnetic wave in a trace is governed by following equation: Time Delay=1/(Square root of L*C), wherein L refers to the inductance of the trace and C refers to the capacitance of the trace. Being that the capacitance for the inner traces 12, 13 is double that of the outer trace 11, 14, electrometric waves travel faster on the outer traces 11, 14 than the inner traces 12, 13, resulting in an appreciable difference in time delay between the inner traces 12, 13 and the outer traces 11, 14. The difference in delay means that simultaneously sent signals (e.g., sent by disk drive control circuitry 20) will be out of phase or otherwise asynchronous with each other further down the trace, which may frustrate operations that depend on synchronous signal transmission between different traces. The rate of signal propagation in the inner traces 12, 13 can be increased by lowering the inductance of the inner traces 12, 13. Specifically, the inductance of the inner traces 12, 13 can be lowered by increasing the widths of the inner traces 12, 13 relative to the outer traces 11, 14. The inner traces 12, 13 can accordingly be made substantially wider than the outer trace 11, 14, as shown in FIGS. 3-4. The inner traces 12, 13 are commonly 3-4 times wider than the outer traces 11, 14. Such difference in width between the inner traces 12, 13 and the outer trace 11, 14 evens the rate of signal propagation in the traces 11-14 of the array 4 such that simultaneously sent signals are simultaneously received.

The consequence of increasing the widths of the inner traces 12, 13 is that the footprint of the trace array 4 is enlarged, which takes up precious space on the flexure 1, causes the flexure 1 to be large and crowd other components, and increases material costs. Various embodiments of the present disclosure concern techniques for addressing asynchronous signal transmission along traces.

SUMMARY

Various embodiments concern a flexure comprising a base metal layer, the base metal layer having a window between a first lateral side of the base metal layer and a second lateral side of the base metal layer. The window can be defined by a first inner edge of the first lateral side and a second inner edge of the second lateral side. The flexure can further comprise a dielectric material layer having a first side and a second side opposite the first side, the first side of the dielectric material layer disposed against the base metal layer. The flexure can further comprise a plurality of traces extending along the second side of the dielectric material layer in an array. Each trace of the plurality of traces can overlap the window. The plurality of traces can comprise a pair of outer traces respectively located on lateral ends of the array and at least one inner trace between the pair of outer traces. All adjacent traces of the plurality of traces can be spaced a first distance from each other. The pair of outer traces can be respectively spaced a second distance from the first and second lateral edges. The first distance can be greater than or equal to the second distance. The ratio of the first distance to the second distance can be 1.0:0.3-1.6, or more specifically 1.0:0.3-1.3, or even more specifically 1.0:0.3-1.0. The array can be configured such that, when the plurality of traces conduct current, adjacent traces of the plurality of traces capacitively couple to each other and the pair of outer traces capacitively couple with each other through the first and second lateral sides, respectively. All traces of the plurality of traces can have the same width since the balancing of the electromagnetic wave is achieved through balancing the capacitance of the outer traces rather than the inductance of the inner traces. The plurality of traces can have equal electromagnetic wave propagation rates. The plurality of traces can be interleaved such that, when the plurality of traces conduct current, adjacent traces have opposite polarities Various embodiments concern a flexure comprising a base metal layer. The base metal layer can have a void between a first lateral side of the base metal layer and a second lateral side of the base metal layer. The flexure can further comprise a plurality of traces in an array. The plurality of traces can extend over the void and between the first and second lateral sides. The plurality of traces can comprise a pair of outer traces respectively located on lateral ends of the array and at least one inner trace between the pair of outer traces. The plurality of traces and the first and second lateral sides can be spaced relative to each other such that adjacent traces of the plurality of traces capacitively couple to each other and the pair of outer traces capacitively couple with each other through the first and second lateral sides. The plurality of traces can be evenly spaced between themselves. The outer spaces can be spaced from the lateral sides in any of the ranges 0.3-1.6, 0.3-1.3, or 0.3-1.0 of the spacing between the adjacent pairs of the plurality of traces. All traces of the plurality of traces can have the same width. The plurality of traces can have equal electromagnetic wave propagation rates. The plurality of traces can be interleaved such that, when the plurality of traces conduct current, adjacent traces have opposite polarities. The flexure can comprise a plurality of windows serially arrayed along the flexure from the proximal location to the distal location, wherein the void comprises one of the plurality of windows. The plurality of traces can span over each of the plurality of windows. The pair of outer traces can capacitively couple with each other through the first and second lateral sides along each of the plurality of windows.

Various embodiments concern a flexure comprising a base metal layer. The base metal layer can have a void between a first lateral side of the base metal layer and a second lateral side of the base metal layer. The flexure can further comprise a plurality of traces in an array, the plurality of traces extending over the void and between the first and second lateral sides. The plurality of traces can comprise a pair of outer traces respectively located on lateral ends of the array. At least one inner trace can be between the pair of outer traces. The plurality of traces can each have the same width. The plurality of traces and the first and second lateral sides can be spaced relative to each other such that all of the plurality of traces have equal electromagnetic wave propagation rates.

Various embodiments concern a circuit comprising a base metal layer, the base metal layer having a window between a first lateral side of the base metal layer and a second lateral side of the base metal layer. The window can be defined by a first inner edge of the first lateral side and a second inner edge of the second lateral side. The circuit can further comprise a dielectric material layer having a first side and a second side opposite the first side, the first side of the dielectric material layer disposed against the base metal layer. The circuit can further comprise a plurality of traces extending along the second side of the dielectric material layer in an array. Each trace of the plurality of traces can overlap the window. The plurality of traces can comprise a pair of outer traces respectively located on lateral ends of the array and at least one inner trace between the pair of outer traces. All adjacent traces of the plurality of traces can be spaced a first distance from each other. The pair of outer traces can be respectively spaced a second distance from the first and second lateral edges. The first distance can be greater than or equal to the second distance. The ratio of the first distance to the second distance can be 1.0:0.3-1.6, or more specifically 1.0:0.3-1.3, or even more specifically 1.0:0.3-1.0. The array can be configured such that, when the plurality of traces conduct current, adjacent traces of the plurality of traces capacitively couple to each other and the pair of outer traces capacitively couple with each other through the first and second lateral sides. All traces of the plurality of traces can have the same width. The plurality of traces can have equal electromagnetic wave propagation rates. The plurality of traces can be interleaved such that, when the plurality of traces conduct current, adjacent traces have opposite polarities Various embodiments concern a circuit comprising a base metal layer. The base metal layer can have a void between a first lateral side of the base metal layer and a second lateral side of the base metal layer. The circuit can further comprise a plurality of traces in an array. The plurality of traces can extend over the void and between the first and second lateral sides. The plurality of traces can comprise a pair of outer traces respectively located on lateral ends of the array and at least one inner trace between the pair of outer traces. The plurality of traces and the first and second lateral sides can be spaced relative to each other such that adjacent traces of the plurality of traces capacitively couple to each other and the pair of outer traces capacitively couple with each other through the first and second lateral sides. The plurality of traces can be evenly spaced between themselves. The outer spaces can be spaced from the lateral sides can be 0.3-1.6, 0.3-1.3, or 0.3-1.0 of the spacing between the adjacent pairs of the plurality of traces. All traces of the plurality of traces can have the same width. The plurality of traces can have equal electromagnetic wave propagation rates. The plurality of traces can be interleaved such that, when the plurality of traces conduct current, adjacent traces have opposite polarities. The circuit can comprise a plurality of windows serially arrayed along the circuit from the proximal location to the distal location, wherein the void comprises one of the plurality of windows. The plurality of traces can span over each of the plurality of windows. The pair of outer traces can capacitively couple with each other through the first and second lateral sides along each of the plurality of windows.

Various embodiments concern a circuit comprising a base metal layer. The base metal layer can have a void between a first lateral side of the base metal layer and a second lateral side of the base metal layer. The circuit can further comprise a plurality of traces in an array, the plurality of traces extending over the void and between the first and second lateral sides. The plurality of traces can comprise a pair of outer traces respectively located on lateral ends of the array. At least one inner trace can be between the pair of outer traces. The plurality of traces can each have the same width. The plurality of traces and the first and second lateral sides can be spaced relative to each other such that all of the plurality of traces have equal electromagnetic wave propagation rates.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

DESCRIPTION OF THE INVENTION

Various embodiments of the present disclosure overcome the limitations discussed above to provide balanced signal transmission while minimizing the footprint of the trace array. Specifically, the lateral sides of the base metal layer are close enough to the trace array that the outer traces of the array capacitively couple with each other through the lateral sides of the base metal layer. Each trace is then capacitively coupled to two elements and all traces therefore have equal signal transmission delay burden. The inner traces do not need to have different dimensions relative to the outer traces to balance transmission delay, which minimizes the footprint of the trace array.

Referring back to FIGS. 1-4, a key 9 is shown indicating X, Y, and Z axes. The flexure 1 generally extends along an X-axis. The flexure 1 is generally elongated along the X-axis in distal and proximal directions, although multiple bends are typically present, as shown. A longitudinal axis of the flexure 1 accordingly extends lengthwise along the flexure 1, parallel with the X-axis. "Proximal" and "distal", as used herein, refer to the relative direction or position along the longitudinal axis of the flexure 1 while "lateral", as used herein, refers to the left and right directions (along the Y-axis) orthogonal to the longitudinal axis of the flexure 1. The flexure 1 has a generally planar orientation co-planar with the X-Y plane. The Z-axis represents height, thickness, or top and bottom orientations.

Figure 5:
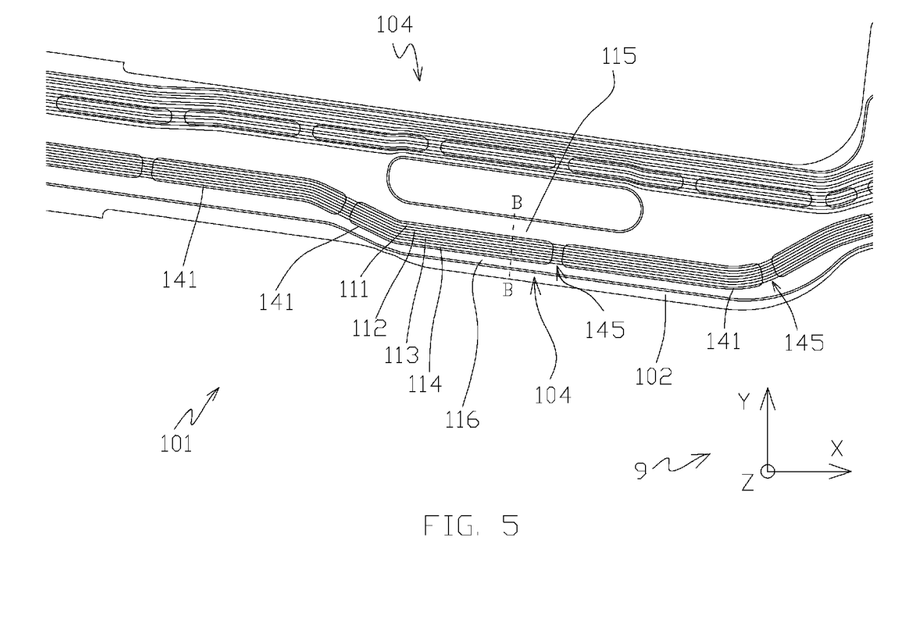
FIG. 5 is a plan view of a section of a flexure.
Figure 6:
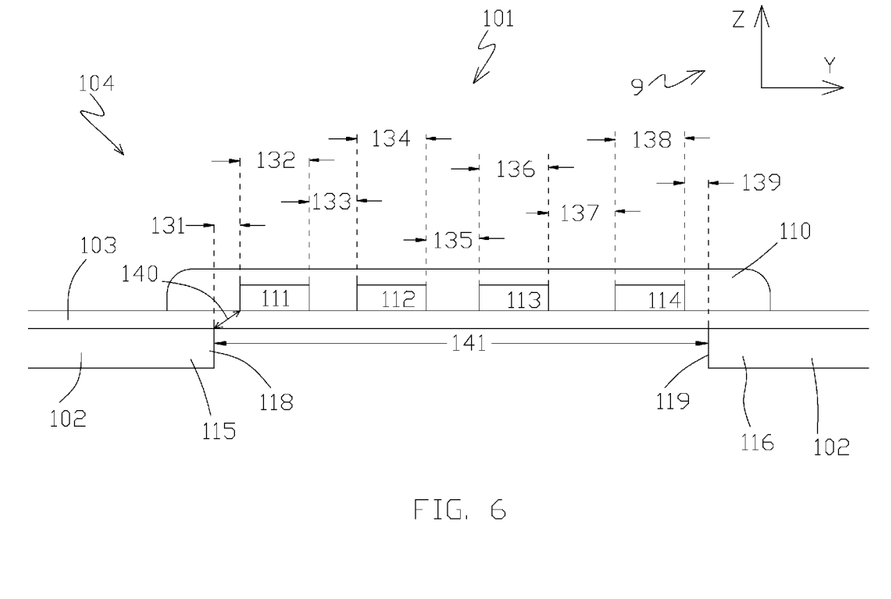
FIG. 6 is a cross sectional view of the flexure along line BB of FIG. 5.

FIG. 5 is a detailed plan view of a section of a flexure 101. The flexure 101 can be configured similarly to any other flexure of a suspension referenced herein (e.g., flexure 1). Components of the flexure 101 can be configured similarly to features of other flexures except as otherwise shown or described. For example, components having similar configurations are indicated by similar reference numbers. An insulation layer would normally be present on the top surface of the flexure 101, similar to the dielectric layer 3 in FIG. 3, but the insulation layer is removed in this view to show detail. As shown, the trace array 104 comprises traces 111-114. FIG. 6 shows a cross sectional view of the flexure 101 along line BB of FIG. 4.

The trace array 104 includes a pair of outer traces 111, 114, and two inner traces 112, 113. The base metal layer 102 comprises a first lateral side 115 and a second lateral side 116. The first lateral side 115 and the second lateral side 116 are separated by a window 141 between the first lateral side 115 and the second lateral side 116. The window 141 is laterally defined by a first lateral edge 118 and a second lateral edge 119. The window 141 is distally and proximally defined by bridges 145. The window 141 shown in FIG. 6 is one of a plurality of windows 141 serially arrayed along the longitudinal axis of the flexure 101 (e.g., along the X-axis), as shown in FIG. 5. As shown, each of the plurality of windows 141 is elongated along the longitudinal axis of the flexure 101 (e.g., along the X-axis). Furthermore, the plurality of windows 141 are serially arrayed along the longitudinal axis of the flexure 101 (e.g., along the X-axis). The serial arrangement of windows 141 extends parallel along the flexure 101 with the trace array 104. Referring to FIG. 1, the windows 141 can be serially arrayed from the proximal end 6 to the distal end 5 of the flexure 1. The trace array 104 can extend parallel with the serially arrayed plurality of windows 141 from the proximal end 6 to the distal end 5 of the flexure 1.

As shown in FIG. 6, a dielectric layer 103 extends over the top side of the base metal layer 102. The dielectric layer 103 can be formed from polyimide. While the base metal layer 102 includes a void in the form of the window 141, the dielectric layer 103 may not include a corresponding void and the dielectric layer 103 may accordingly extend over the window 141 from the first lateral side 115 to the second lateral side 116. A covercoat 110 may be deposited over the dielectric layer 103 and/or the trace array 104.

The trace array 104 comprises a plurality of traces 111-114. While FIGS. 5-6 show four traces 111-114 in the trace array 104, other numbers of traces are possible, such as three, five, six, or eight, among other options. Each of the traces 111-114 extends parallel with the longitudinal orientation of the windows 141, including parallel with the first and second lateral edges 118, 119 defining the windows. The traces 111-114 can remain in parallel extension with the first and second lateral edges 118, 119 along curves in the flexure 101, as shown. The traces 111-114 can remain in parallel extension with the first and second lateral edges 118, 119 along curves in the flexure 101, as shown. The traces 111-114 can remain in parallel extension with the plurality of windows 141 along most or all of the length of the flexure 101 (e.g., from the proximal end 6 to the distal end 5 of the flexure 1). The traces can be interleaved such that trace 111 carries a first polarity (e.g., positive), trace 112 carries a second polarity (e.g., negative) opposite to the first polarity, trace 113 carries the first polarity, and trace 114 carries the second polarity. The polarities can reverse during data transmission, however the differential polarities of adjacent traces can remain.

The traces 111-114 have widths 132, 134, 136, 138, respectively. The widths 132, 134, 136, 138 are preferably equal to each other. The thickness of each trace 111-114 can be between 5-20 micrometers, or more specifically between 10-12 micrometers, for example. The traces 111-114 are separated from each other by trace separation distances 133, 135, 137, respectively. The trace separation distances 133, 135, 137 can be equal to each other, such that the traces 111-114 are evenly spaced from each other along the width of the trace array 104. The trace separation distances 133, 135, 137 can be between 5-50 micrometers, or more specifically between 15-20 micrometers, for example. The outer edges of the outer traces 111, 114 are separated from the first lateral edge 118 and the second lateral edge 119 by separation distances 131, 139, respectively. The separation distances 131, 139 are preferably equal to each other. It is noted that separation distances 131-139 are all measured along one axis (e.g., along the Y-axis). Alternatively, the separation distances 131, 139 between the outer traces 111, 114 and the first and second lateral edges 118, 119 can be measures along both the Y-axis and the Z-axis. For example, the distance 140 between the outer edge of the outer trace 111 and the first lateral edge 118 can be measured directly between the outer trace 111 and the first lateral side 115. The distance 140 is out of plane or non-parallel with the general orientations of the base metal layer 102, the dielectric layer 103, and the trace array 104 (i.e. the distance 140 may not be measured solely along the Y-axis but may instead be a hypotenuse along the Y-axis and the Z-axis). As shown in FIG. 6, the width of the trace array 104 is less than the width of the window 141. The trace array 104 is located directly over the window 141 such that none of the traces 111-114 overlap with either of the first and second lateral sides 115, 116 and the traces 111-114 are between the first and second lateral edges 118, 119 along the Y-axis.

The separation distances 131, 133, 135, 137, 139 are small enough that the traces 111-114 and the first and second lateral sides 115, 116 of the base metal layer 102 capacitively couple with adjacent elements of the group. Specifically, trace 111 capacitively couples with the first lateral side 115 and trace 112. Trace 112 capacitively couples with the traces 111, 113. Trace 113 capacitively couples with the traces 112, 114. Trace 114 capacitively couples with the second lateral side 116 and trace 113. Because the first and second lateral sides 115, 116 are part of the same base metal layer 102, trace 111 essentially capacitively couples with trace 114 through the base metal layer 102. In this way, each of the traces 111-114 is capacitively coupled with two other trace elements. This is unlike the configuration of FIGS. 3-4 wherein the outer traces 11, 14 do not capacitively couple with the first and second lateral sides 15, 16, respectively and therefore do not capacitively couple to two trace elements. Each trace 111-114 being capacitively coupled to two adjacent elements results in each trace 111-114 being equally burdened by capacitive coupling and therefore having the same signal propagation delay associated with capacitive coupling. This eliminates the need to increase the inductance of the inner traces 112, 113 relative to the outer traces 111, 114, and accordingly allows the inner traces 112, 113 to have the same widths 132, 134, 136, 138 as the outer traces 111, 114.

The capacitance value measurable between the first and second lateral sides 115, 116 and the pair of outer traces 111, 114, respectively, will be approximately half that of the capacitance value between any adjacent pairs of traces 111-114. However, the electrical continuity of the first and second lateral sides 115, 116 allows the base metal layer 102 to function as one conductor that is capacitively coupled to both of the pair of outer traces 111, 114. Considering that the pair of outer traces 111, 114 can carry signals of opposite polarity, the outer traces 111, 114 can essentially capacitively couple to each other through the base metal layer 102.

The base metal layer 102 can function as a shared ground plane for the flexure 101. While the first and second lateral sides 115, 116 of the base metal layer 102 are shown in FIG. 6 as separated by window 141, the first and second lateral sides 115, 116 are nevertheless electrically coupled with each other through other areas of the base metal layer 102. For example, as shown in FIG. 5, first and second lateral sides 115, 116 are connected to each other by the bridges 145. The bridges 145 are formed by sections of the base metal layer 102 that span between the first and second lateral sides 115, 116 between the windows 141. The windows 141 are voids in the base metal layer 102 that extend from the top side of the base metal layer 102 to a bottom side of the base metal layer 102. The pattern of the bridges 145 alternating with the windows 141 can extend along some, most, or all of the length of the flexure 101 (e.g., from the proximal end 6 to the distal end 5 of the flexure 1 of FIG. 1). The bridges 145 can be located with a spacing of one per millimeter between adjacent bridges 145. As further shown in FIG. 6, the pattern extends straight along one or more sections of the flexure 101 and can bend along one or more other sections of the flexure 101. The spacing between the traces 111-114 (e.g., trace separation distances 133, 135, 137) and the spacing between the outer traces 111, 114 and the first and second lateral sides 115, 116 (e.g., separation distances 131, 139) is maintained along the length of the flexure 101, including curves, to maintain balanced capacitive coupling and equivalent signal delay in the traces 111-114 of the trace array 104 along the length of the flexure 101. The trace separation distances 133, 135, 137 between the traces 111-114 and the separation distances 131, 139 between the outer traces 111, 114 and the first and second lateral sides 115, 116 can be maintained along some, most, or all of the length of the flexure 101 (e.g., from the proximal end 6 to the distal end 5 of the flexure 1 of FIG. 1).

In some embodiments, the spacing between adjacent traces 111-114 of the trace array 104 is equal to the spacing between the outer traces 111, 114 and the first and second lateral sides 115, 116, respectively. Specifically, each of the separation distances 133, 135, 137 is equal to each of the separation distances 131, 139. In some other embodiments, the spacing between adjacent traces 111-114 of the trace array 104 is larger than the spacing between the outer traces 111, 114 and the first and second lateral sides 115, 116, respectively. For example, each of the separation distances 133, 135, 137 may be greater than each of the separation distances 131, 139. The separation distances 131, 139 being smaller than the separation distances 133, 135, 137 can ensure capacitive coupling between outer traces 111, 114 and the first and second lateral sides 115, 116, respectively. In testing, it was determined that trace arrays had acceptable performance characteristics (e.g., similar signal propagation rates) when the ratio between the separation distances 133, 135, 137 and the separation distances 131, 139 was 1.0:0.3-1.0. In other words, the distance between the inner edges of the outer traces 111, 114 and the first and second lateral edges 118, 119 is preferably 0.3-1.0 of the distance between adjacent pairs of the traces 111-114, however it is believed that a ratio between 1.0:0.3-1.6 or 1.0:0.3-1.3 may be suitable in some embodiments.

Figure 7:
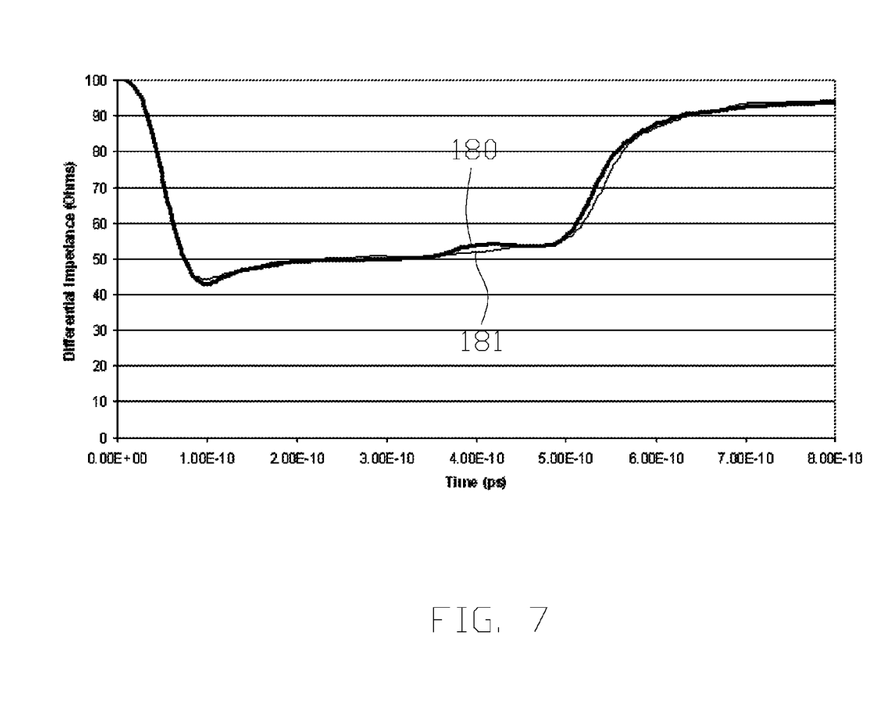
FIG. 7 is a plot comparing electrical performance data of flexures.

FIG. 7 is a plot of test data. The plot shows differential impedance data 180 for a conventional trace array similar to that shown in FIGS. 3-4. The plot further shows differential impedance data 181 for a common width trace array similar to that shown in FIGS. 5-6. As shown, the trace arrays exhibited essentially identical differential impedance performance despite the common width trace array being about 40% narrower than the conventional trace array.

Figure 8:
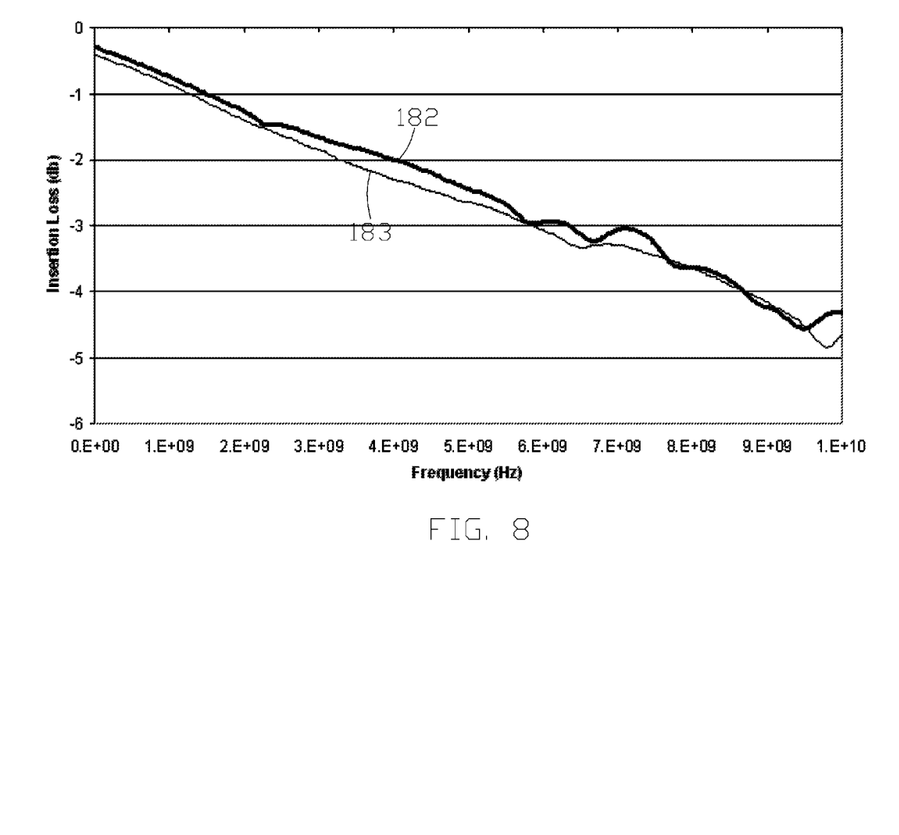
FIG. 8 is a plot comparing electrical performance data of flexures.

FIG. 8 is a plot of test data. The plot shows bandwidth performance data 183 for a conventional trace array similar to that shown in FIGS. 3-4. The plot further shows bandwidth performance data 184 for a common width trace array similar to that shown in FIGS. 5-6. As shown, the trace arrays exhibited essentially identical bandwidth performance despite the common width trace array being about 40% narrower than the conventional trace array.

Figure 9:
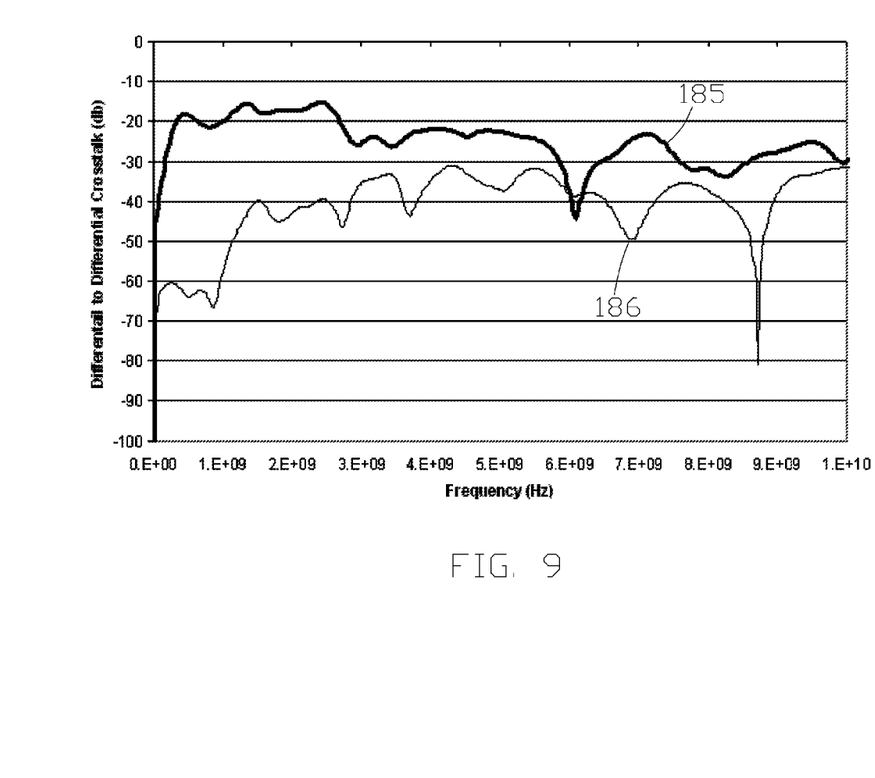
FIG. 9 is a plot comparing electrical performance data of flexures.

FIG. 9 is a plot of test data. The plot shows differential crosstalk performance data 185 for a conventional trace array similar to that shown in FIGS. 3-4. The plot further shows differential crosstalk performance data 186 for a common width trace array similar to that shown in FIGS. 5-6. As shown, the common width trace array exhibited improved differential crosstalk performance relative to the conventional trace array.

Figure 10:
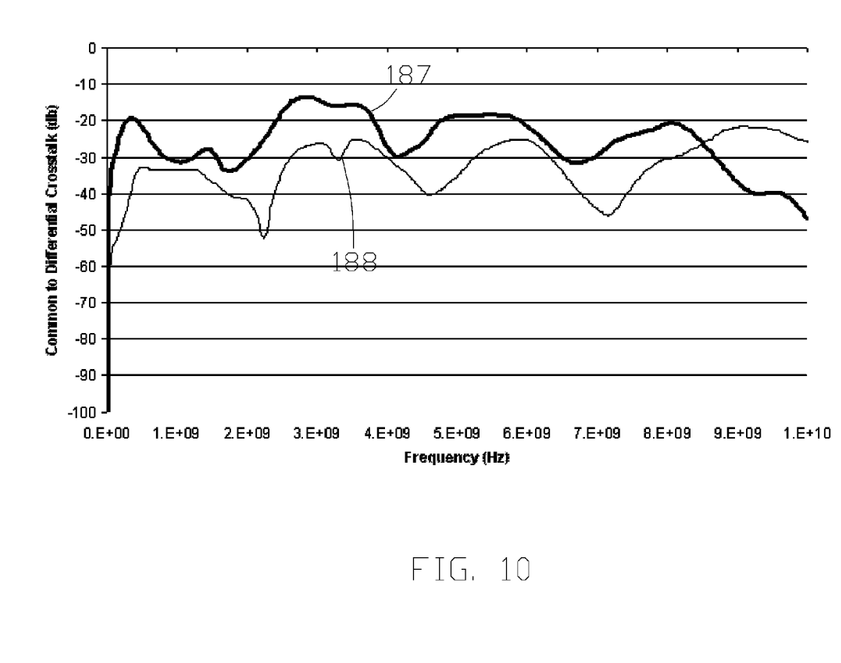
FIG. 10 is a plot comparing electrical performance data of flexures.

FIG. 10 is a plot of test data. The plot shows common crosstalk performance data 187 for a conventional trace array similar to that shown in FIGS. 3-4. The plot further shows common crosstalk performance data 188 for a common width trace array similar to that shown in FIGS. 5-6. As shown, the common width trace array exhibited improved common crosstalk performance relative to the convention trace array.

Although exemplar embodiments are presented herein to demonstrate various features of the present invention, various modifications are contemplated as being within the scope of the present disclosure. Those skilled in the art will recognize that changes can be made in form and detail to the disclosed and referenced embodiments without departing from the spirit and scope of the invention. For example, while a trace array having similar rates of signal propagation, and similar trace widths, are shown for use with a flexure, such a trace array can be employed in other circuits, other than hard disk drives. While a hard disk drive serves as a preferred exemplar, a circuit consistent with the present disclosure, such as a multi-trace array on a flexible circuit support by a windowed base metal layer to which outer traces capacitively couple to balance signal propagation rates, can be employed in any manner described herein in any other type of circuit.

The invention claimed is:

1. A flexure comprising:
   a base metal layer, the base metal layer having a window between a first lateral side of the base metal layer and a second lateral side of the base metal layer, the window defined by a first inner edge of the first lateral side and a second inner edge of the second lateral side;
   a dielectric material layer having a first side and a second side opposite the first side, the first side of the dielectric material layer disposed against the base metal layer; and
   a plurality of traces extending along the second side of the dielectric material layer in an array, each trace of the plurality of traces overlapping the window, the plurality of traces comprising a pair of outer traces respectively located on lateral ends of the array and at least one inner trace between the pair of outer traces, wherein all adjacent traces of the plurality of traces are spaced a first distance from each other, the pair of outer traces are respectively spaced a second distance from the first and second lateral edges, and the first distance is greater than or equal to the second distance.

2. The flexure of claim 1, wherein the ratio of the first distance to the second distance is 1.0:0.3-1.0.

3. The flexure of claim 1, wherein the array is configured such that, when the plurality of traces conduct current, adjacent traces of the plurality of traces capacitively couple to each other and the pair of outer traces capacitively couple to each other through the first and second lateral sides.

4. The flexure of claim 1, wherein all traces of the plurality of traces have the same width.

5. The flexure of claim 4, wherein the plurality of traces have equal electromagnetic wave propagation rates.

6. The flexure of claim 1, wherein the plurality of traces are interleaved such that, when the plurality of traces conduct current, adjacent traces have opposite polarities.

7. The flexure of claim 1, wherein the at least one inner trace comprises two inner traces.

8. The flexure of claim 1, wherein the plurality of traces are co-planar in the array.

9. The flexure of claim 1, wherein the plurality of traces extend from a proximal location along the flexure to a distal location along the flexure.

10. The flexure of claim 9, wherein the flexure comprises a plurality of windows serially arrayed along the flexure from the proximal location to the distal location, the plurality of traces span over each of the plurality of windows, and the spacing of the first and second distances are maintained along each of the plurality of windows.

11. The flexure of claim 1, wherein the base metal layer is stainless steel.

12. The flexure of claim 1, wherein the dielectric material layer is formed from polyimide.

13. The flexure of claim 1, further comprising disk drive control circuitry configured to output electrical read and write signals to the plurality of traces, the signals capacitively coupling the plurality of traces to each other, the signals also capacitively coupling the pair of outer traces to each other through the first and second lateral sides.

14. A flexure comprising:
- a base metal layer, the base metal layer having a void between a first lateral side of the base metal layer and a second lateral side of the base metal layer; and
- a plurality of traces in an array, the plurality of traces extending over the void and between the first and second lateral sides, the plurality of traces comprising a pair of outer traces respectively located on lateral ends of the array and at least one inner trace between the pair of outer traces, wherein adjacent traces of the plurality of traces are spaced a first distance from each other, the pair of outer traces are respectively spaced a second distance from the first and second lateral sides, the ratio of the first distance to the second distance is 1.0:0.3-1.3, and the first distance and the second distance are dimensioned such that adjacent traces of the plurality of traces capacitively couple to each other and the pair of outer traces capacitively couple with each other through the first and second lateral sides.

15. The flexure of claim 14, further comprising a dielectric material layer located between, and contacting each of, the base metal layer and the plurality of traces.

16. The flexure of claim 14, wherein the first distance is greater than the second distance.

17. The flexure of claim 14, further comprising disk drive control circuitry configured to output electrical read and write signals to the plurality of traces, the signals capacitively coupling adjacent traces of the plurality of traces to each other, the signals also capacitively coupling the pair of outer traces to each other through the first and second lateral sides.

18. The flexure of claim 14, wherein all traces of the plurality of traces have the same width.

19. The flexure of claim 14, wherein the plurality of traces have equal electromagnetic wave propagation rates.

20. The flexure of claim 14, wherein the plurality of traces are interleaved such that, when the plurality of traces conduct current, adjacent traces have opposite polarities.

21. The flexure of claim 14, wherein the flexure comprises a plurality of windows serially arrayed along the flexure from a proximal location to a distal location, the void comprises one of the plurality of windows, the plurality of traces span over each of the plurality of windows, and the pair of outer traces capacitively couple to each other through the first and second lateral sides along each of the plurality of windows.

22. A flexure comprising:
- a base metal layer, the base metal layer having a void between a first lateral side of the base metal layer and a second lateral side of the base metal layer; and
- a plurality of traces in an array, the plurality of traces extending over the void and between the first and second lateral sides, the plurality of traces comprising a pair of outer traces respectively located on lateral ends of the array and at least one inner trace between the pair of outer traces, wherein the plurality of traces each have the same width, adjacent traces of the plurality of traces are spaced a first distance from each other, the pair of outer traces are respectively spaced a second distance from the first and second lateral sides, the ratio of the first distance to the second distance is 1.0:0.3-1.3, and the first distance and the second distance are dimensioned such that the plurality of traces have equal electromagnetic wave propagation rates.

23. The flexure of claim 22, further comprising a dielectric material layer located between, and contacting each of, the base metal layer and the plurality of traces.

24. The flexure of claim 22, wherein adjacent traces of the plurality of traces capacitively couple to each other and the pair of outer traces capacitively couple to each other through the first and second lateral sides.

25. The flexure of claim 24, further comprising disk drive control circuitry configured to output electrical read and write signals to the plurality of traces, the signals capacitively coupling the plurality of traces to each other, the signals also capacitively coupling the pair of outer traces to each other through the first and second lateral sides.

26. The flexure of claim 22, wherein the first distance is greater than the second distance.

27. The flexure of claim 22, wherein the plurality of traces are interleaved such that, when the plurality of traces conduct current, adjacent traces have opposite polarities.

28. The flexure of claim 22, wherein the flexure comprises a plurality of windows serially arrayed along the flexure from a proximal location to a distal location, the void comprises one of the plurality of windows, the plurality of traces span over each of the plurality of windows, and the pair of outer traces capacitively couple to each other through the first and second lateral sides along each of the plurality of windows.

* * * * *